US010185487B2

United States Patent
Loretan et al.

(10) Patent No.: US 10,185,487 B2
(45) Date of Patent: Jan. 22, 2019

(54) DIRECTION BASED CONTENT NAVIGATION

(71) Applicant: Comcast Cable Communications, LLC, Philadelphia, PA (US)

(72) Inventors: Thomas Loretan, Trumbull, CT (US); Heather Hollis, Ardmore, PA (US); George Robert Kissinger, Philadelphia, PA (US); Justin Gravante, Audubon, NJ (US); Matthew Luther, Philadelphia, PA (US); Eugene Kernan, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 305 days.

(21) Appl. No.: 14/246,687

(22) Filed: Apr. 7, 2014

(65) Prior Publication Data

US 2015/0153944 A1 Jun. 4, 2015

Related U.S. Application Data

(60) Provisional application No. 61/910,701, filed on Dec. 2, 2013.

(51) Int. Cl.
*G06F 3/0485* (2013.01)
*G06F 3/0488* (2013.01)

(52) U.S. Cl.
CPC ........ *G06F 3/04855* (2013.01); *G06F 3/0488* (2013.01)

(58) Field of Classification Search
None
See application file for complete search history.

(56) References Cited

U.S. PATENT DOCUMENTS

| | | | |
|---|---|---|---|
| 6,910,191 B2 * | 6/2005 | Segerberg | H04N 5/44543 348/E5.105 |
| 6,938,218 B1 * | 8/2005 | Rosen | G06F 3/04815 345/419 |
| 2001/0028369 A1 * | 10/2001 | Gallo | G06F 3/04815 715/848 |
| 2005/0206658 A1 * | 9/2005 | Fagans | G06F 3/0481 345/660 |
| 2011/0107272 A1 * | 5/2011 | Aguilar | G06F 3/04815 715/853 |
| 2012/0260211 A1 | 10/2012 | Sathish et al. | |

OTHER PUBLICATIONS

NDS Snowflake Set-top-box user interface demo, YouTube video uploaded on Jan. 20, 2012, available at: https://www.youtube.com/watch?v=dSJY85szFlw.

* cited by examiner

*Primary Examiner* — Pei Yong Weng
(74) *Attorney, Agent, or Firm* — Ballard Spahr LLP

(57) ABSTRACT

Methods and systems for providing and interfacing with content are disclosed. An example method can comprise providing an interface and receiving an interaction with the interface. The interface can be updated with a first element if the interaction is in a first direction. The first element can provide information based on user data. The interface can be updated with a second element if the interaction is in a second direction.

20 Claims, 8 Drawing Sheets

DIRECTION BASED CONTENT NAVIGATION

CROSS REFERENCE TO RELATED PATENT APPLICATION

This application claims priority to U.S. Patent Application No. 61/910,701 filed Dec. 2, 2013, which is herein incorporated by reference in its entirety.

BACKGROUND

The amount of content available to users is growing. When presented on televisions, or other displays, content is often organized as channels. The amount of content and the number of content channels, however, is becoming too large to browse quickly with traditional interfaces, such as program guides and channel selection techniques. Additionally, content that is not organized according to traditional channels is becoming more popular. Thus, there is a need for more sophisticated interfaces for browsing and accessing content.

SUMMARY

It is to be understood that both the following general description and the following detailed description are exemplary and explanatory only and are not restrictive, as claimed. Disclosed are methods and systems for providing, accessing, and navigating content. An example method can comprise providing an interface and receiving an interaction with the interface. The interface can be updated with a first element if the interaction is in a first direction. The first element can provide information based on user data. The interface can be updated with a second element if the interaction is in a second direction.

In another aspect, an example method can comprise receiving a user interaction. A display can be updated with a first element if the user interaction is in a first direction. The first element can comprise at least one of a viewing history element, a recommendation element, a user preferences element, a content recording element, a social media element, a content browsing element, and/or other elements. The display can be updated with a second element if the user interaction is in a second direction. The second element can comprise at least one of a viewing history element, a recommendation element, a user preferences element, a content recording element, a social media element, a content browsing element, and/or other elements. The second element can be different than the first element.

In another aspect, an example method can comprise receiving a signal indicative of an instruction from a user. A collection of content associated with the user based on a relevancy criterion can be provided if the instruction is associated with a first direction. A collection of general content available to the user can be provided if the instruction is associated with a second direction.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
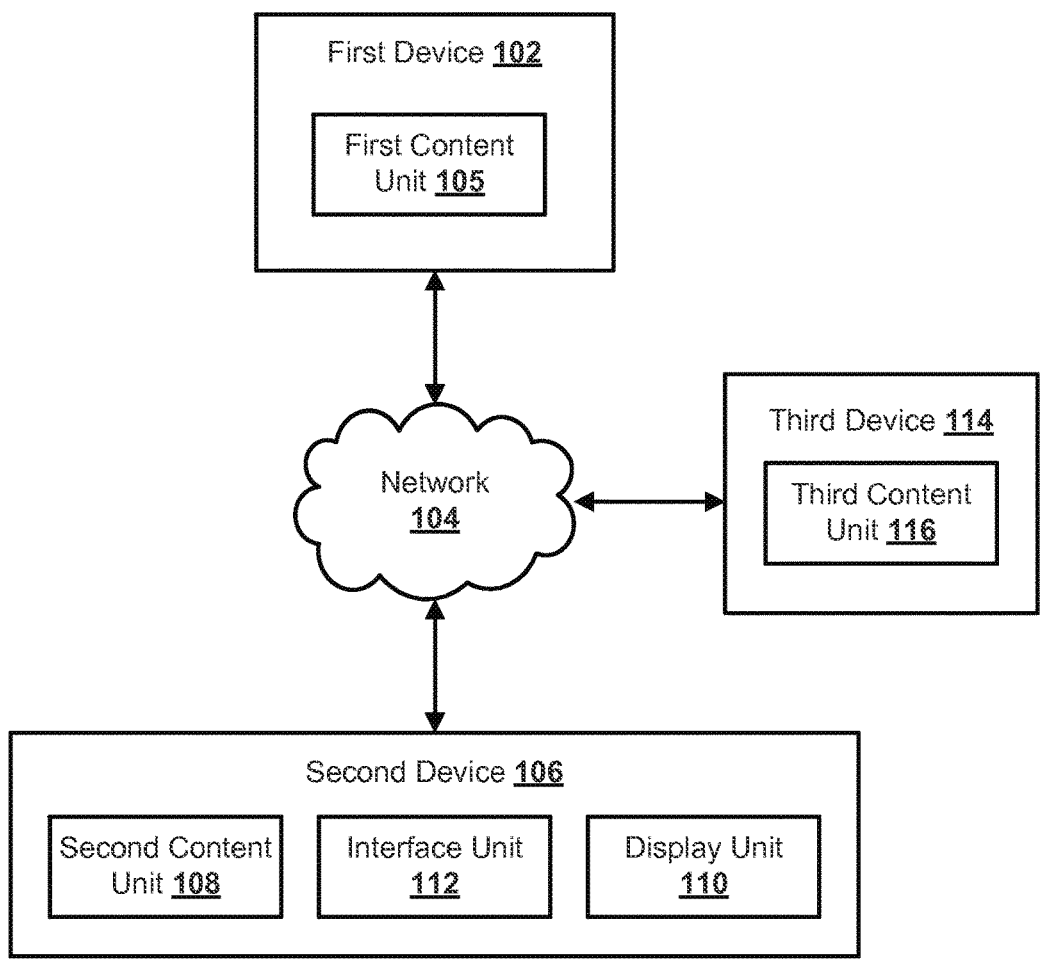
FIG. 1 is a block diagram illustrating various aspects of an example system in which the present methods and systems can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to providing content through an interface. Specifically, the present disclosure relates to a user interface that provides different interface elements based on the directionality of user interactions with the interface. The interface elements can scroll in the direction of the user interaction. For example, a first element can be provided if the user interacts with the interface in a first direction. A second element can be provided if the user interacts with the interface in a second direction. In one aspect, the second direction can be orthogonal (e.g., perpendicular) to the first direction. For example, the first direction can be vertical (e.g. up or down), and the second direction can be horizontal (e.g., left or right). As an illustration, the first element can provide a list of content channels (e.g., content sources), and the second element can provide a user data related element, such as a viewing history element, content recordings element, user preferences element, social media element, or a content recommendations element. The first element, second element, and additional elements can display individual content items (e.g., or previews and/or links to the content items) as navigation tiles that can be swiped, scrolled, or otherwise manipulated by movement, gestures, and/or orientation. Content items can comprise shows, episodes, programs, movies, video recordings, live content streams, video games, and/or the like. In some implementations, the interface can be on one device (e.g., tablet, mobile phone) and the content can be displayed on another device (e.g., set-top box, television).

FIG. 1 illustrates various aspects of an example system 100 in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware. In an exemplary embodiment, the methods and systems disclosed can be located within one or more interface units of the second device.

In one aspect, the system 100 can comprise a first device 102. In one aspect, the first device 102 can be configured to provide (e.g., transmit or provide access to) content though a network 104. The first device 102 can comprise a computing device such as a content server (e.g., a converged access server). For example, the first device 102 can comprise one or more first content units 105 configured to package, encode, compress, encrypt, embed, modulate and/or or otherwise convert content to a suitable form for distribution across the network 104. In one aspect, content can comprise, audio, video, data, text, applications, social media, and/or the like. For example, content can comprise live content streams, video on demand, video recordings, user data (e.g., preferences, user settings, viewing history), and/or the like.

In one aspect, the network 104 configured to transfer the content and other data to and throughout the system 100. In one aspect, the network 104 can comprise a packet switched network (e.g., internet protocol based network), a non-packet switched network (e.g., quadrature amplitude modulation based network), and/or the like. The network 104 can comprise network adapters, switches, routers, modems, and the like connected through wireless links (e.g., radio frequency, satellite) and/or physical links (e.g., fiber optic cable, coaxial cable, Ethernet cable, or a combination thereof). In one aspect, the network 104 can be configured to provide communication from telephone, cellular, modem, and/or other electronic devices to and throughout the system 100.

In one aspect, the system 100 can comprise a second device 106 configured to receive and process content. For example, the second device 106 can comprise a computer station, laptop, smart device (e.g., smart phone, smart watch, smart glasses, smart apparel), tablet device, and/or other computing device. In one aspect, the second device 106 can comprise one or more second content units 108 configured to unpackage, assemble, decode, decompress, decrypt, select, demodulate and/or otherwise convert content to a suitable form for presenting the content to a user.

In one aspect, the second device 106 can comprise a display unit 110 configured to display content and other data to a user. In one aspect, the display unit 110 can comprise a touch screen configured to receive interactions from a user. The touchscreen can be capacitive, resistive, or the like. For example, the touch screen can detect the presence of an object in contact with a portion of the touch screen, such as a finger, a stylus, or the like. As an illustration, the touch screen can be divided into a plurality of interaction cells configured to detect the presence of an object. As the object moves across the touch screen, interaction cells can be triggered to produce a signal or otherwise indicate the presence of an object over the cell. Parameters (e.g., length, angle, direction, velocity, intensity, duration, magnitude, and/or the like) can be determined (e.g., based on the output of the interaction cells) that can indicate properties of a user interaction. In one aspect, the second device 106 can comprise other interaction cells configured to detect spatial movement (e.g., orientation, rotation, up, down, shake, forward, backward) of the second device 106 and/or other interactions (e.g., user movements, gestures) not in contact with the touch screen.

In one aspect, the second device 106 can comprise an interface unit 112 configured to provide an interface for a user to interact with content. The display unit 110 can be configured to display the interface provided by the interface unit 112. In one aspect, the interface unit 112 can provide one or more sequences of navigation tiles. An example navigation tile can be associated with and/or represent a content item. A content item can comprise, a content channel (e.g., television channel, content stream, content source), show, episode, movie, live stream, video on demand item, video recording, application, and the like. An example navigation tile can comprise information indicative of a content item. For example, the information indicative of a content item can comprise a name and/or other indicator (e.g., channel number) of a content channel (e.g., television channel, content stream, content source), name of a content item, type of content item (e.g., channel, source, video on demand, recording, live show).

In one aspect, the interface unit 112 can be configured to receive an interaction, such as a user instruction. As an illustration, the interface unit 112 can be configured to receive a signal indicative of the interaction. The interface unit 112 can be configured to identify the interaction based on the signal. For example, the interaction can be received from the display unit 110 or from one or more other peripherals (e.g., camera, microphone, keyboard, mouse). The interface unit 112 can be configured to determine one or more parameters based on the interaction. The one or more parameters can comprise orientation, direction, length, angle, duration, velocity, magnitude, intensity, and/or the like. The interface unit 112 can be configured to determine a direction of the interaction. For example, the interface unit 112 can be configured to detect a direction based on the movement of an object across the touch screen. As another example, the interaction can have a pre-defined association with a direction. For example, a left arrow key can be associated with a left direction. As another example, a speech command, such as "right" or "recommendations" can be associated with a specific direction, such as a direction towards the right side of the interface. The interface unit 112 can be configured to compare the parameter to one or more predefined parameters. For example, the interface unit 112 can be configured to compare a direction to one or more predefined directions. As a further example, predefined directions can comprise a horizontal direction (e.g., left, right), a vertical direction (e.g., up, down), a diagonal direction (e.g., up and left, down and left, up and right, down and right), any other direction, and combinations thereof. The interface unit 112 can be configured to determine that the parameter matches (e.g., within a threshold) a predefined parameter. For example, if the direction is within a threshold angle (e.g., 5, 10, 15, 20, 30, 45 degrees) from the predefined direction, interface unit 112 can be configured to determine that the direction matches or is otherwise in the predefined direction.

In one aspect, the interface unit 112 can be configured to provide a variety of interface elements. In one aspect, an element can be a graphical interface element or other similar element. For example, and element can comprise a window, button, link, image, text, video, box, scroll bar, and/or the like. An element can comprise interaction functionality. For example, an element can comprise and/or be associated with computer readable code configured to instruct a processor based on an interaction with the element. In one aspect, an interface element can be an element based on user information. For example, an interface element can be configured to present a collection of content (e.g., or preview and/or link to the content) selected for a specific user according to a relevancy criterion. The relevancy criterion can comprise at least one of viewing history associated with the user, recommendations associated with the user, preferences associated with the user, content recordings associated with the user, social media associated with the user, and the like. As an example, interface unit 112 can provide an interface element, such as a viewing history element, a recommendation element, a user preferences element, a content recording element, a social media element. An example viewing history element can comprise a collection of content (e.g., or previews and/or links to the content) previously accessed by a user. An example recommendation element can comprise a collection of content (e.g., or previews and/or links to the content) recommended for a user based on user information, such as user viewing history, preferences, scheduled recordings, social media, and/or the like. An example user preferences element can comprise a collection of interface elements configured to allow a user to input and/or modify user preferences, such as language, payment options, subscription information, geographic location, user interests, and/or the like. An example content recordings element can comprise a collection of content (e.g., or previews and/or links to the content) recorded for the user, suggested content to record, and/or content scheduled to record. An example social media element can comprise a collection of social media interfaces configured to allow a user to interact with one or more social media servers. The social media element can comprise a collection of content (e.g., or previews and/or links to the content) relevant to social media interactions of the user.

In one aspect, an element can be a predefined element, a user created element, community created element, and/or the like. An element can be managed based on a defined set of computer readable code, such as application programming interface (API). A user created element can present previews and/or links to content items selected based on criteria specified by a user. The criteria can be based on time, genre, ratings, user history, user likes, user content sharing history, actor, actress, content type (e.g., animated, black and white, movie, television show, three-dimensional, HD, Ultra-HD, audio quality), language, and/or the like. As a further example, an element can comprise an element associated with a particular content provider. The element can present links to content based on design criteria specified by the content provider. As another example, an element can comprise gaming content, such as previews and/or links to access a variety of games. As an illustration, a gaming element can display previews of one or more users' current gaming instance and/or previously recorded gaming instances.

In another aspect, the interface element can be an element based on available content. For example, the content can be content generally available to everyone, content associated with a subscription plan, content requiring a payment to access, and/or the like. As another example, the available content can comprise content based on a content guide, such as an electronic program guide. For example, the available content can comprise content organized as a plurality of channels, such as television channels, channels by genre, channels by geographic location, one or more content sources (e.g., a list thereof), or other collection of channels. In one aspect, each of the described collections of content (e.g., user information based or available content based) can be provided to the user as a sequence of navigation tiles.

In one aspect, the interface unit 112 can be configured to operate (e.g., scroll, pinch, zoom, twist, turn, click, press, morph, blend, sound, change, update) the interface based on the parameter, such as a predefined direction. For example, the interface unit 112 can be configured to provide a specified interface element based on the parameter (e.g., direction) of a user instruction matching, being associated with, or otherwise being in a predefined parameter. As an example, a first direction can be associated with a first element that provides information based on user data. As a further example, the first element can provide a viewing history element, a recommendation element, a user preferences element, a content recording element, a social media element, and the like. When the interface receives an instruction from a user that matches, is associated with, or is otherwise in the first direction, the interface unit 112 can be configured to scroll the collection of content associated with the first element. For example, the interface unit 112 can scroll navigation tiles indicative of the content associated with the first element. In one aspect, the interface unit 112 can scroll the navigation tiles in the same and/or opposite direction of the predefined direction matching the user instruction. In one aspect, the interface unit 112 can be configured to update the interface by replacing another interface element with the second element. For example, the interface unit 112 can replace an element (e.g., second element) configured to scroll in a direction different than the first direction with the first element.

As a further example, a second element can be associated with a second direction. The second element can comprise a collection of available content, such as content channels (e.g., television channel, content stream, content sources), available for browsing and/or searching by users. The interface unit 112 can be configured to update the interface with the second element when an interaction matches, is associated with, or is otherwise in the second direction. When the interface receives an instruction from a user that matches, is associated with, or is otherwise in the second direction, the interface unit 112 can be configured to scroll the collection of content associated with the second element. For example, the interface unit 112 can scroll navigation tiles indicative of the content associated with the second element. In one aspect, the interface unit 112 can scroll the navigation tiles in the same or opposite direction of the second direction. In one aspect, the interface unit 112 can be configured to update the interface by replacing another interface element with the second element. For example, the interface element can replace an element (e.g., first element) configured to scroll in a direction different than the second direction with the second element. By way of illustration, the first direction can be perpendicular to the second direction. For example, the first direction can be a horizontal direction and the second direction can be a vertical direction. In another aspect, the first direction can be a vertical direction and the second direction can be a horizontal direction.

It should be understood that in some implementations, the interface unit 112 can be configured to manage additional interface elements, such as a third element, fourth element, fifth element, and the like. As an example, additional interface elements can be in a direction opposite to the first element and/or second element. As an illustration, a user instruction matching (e.g., associated with, being in) a first direction can activate (e.g., scroll, make visible) and scroll the first element, a user instruction matching (e.g., associated with, being in) a second direction can activate the second element, a user instruction matching (e.g., associated with, being in) a third direction can activate the third element, and a user instruction matching (e.g., associated with, being in) a fourth direction can activate the fourth element.

In one aspect, the interface unit 112 can be configured to provide a preview of content. As an example, the interface unit 122 can provide a preview window configured to display content, such as a content item. The preview window can show, for example, live content currently being provided by a content channel, recorded content, video on demand and other content. In one aspect, navigation tiles of the current interface element can be provided in front of the preview window, thereby allowing a user to browse a collection of content while viewing content in the preview window. The preview window can be updated according to a user instruction selecting a particular content item and/or content channel.

In one aspect, the interface unit 112 can be configured to allow a user to access content. For example, an interface element can provide a link to access content. In one aspect, the link can be provided on a navigation tile of the interface element. The navigation tile can be associated with a particular content item. In one aspect, the interface unit 112 can provide a link to access (e.g., view) the content item from the second device 106. In another aspect, the interface unit 112 can provide a link to access the content from another device (e.g., third device).

In one aspect, the system 100 can comprise a third device 114. The third device 114 can comprise a device located at a user premises. For example, the third device 114 can comprise a set-top box, digital streaming device, smart device (e.g., smart watch, smart glasses, smart watch, smart apparel), tablet device, digital terminal adaptor, television, and/or other computing device. In one aspect, the third device 114 can comprise a third content unit 116 configured to receive and process content. The third content unit 116 can be configured to unpackage, assemble, decode, decompress, decrypt, select, demodulate and/or otherwise convert content to a suitable form for presenting the content to a user. In one aspect, the third content unit 116 can be configured to allow a user to navigate and select content accessible to the third device 114. For example, the third content unit 116 can provide a user interface configured to allow a user to navigate content (e.g., live content streams, video on demand, recordings, user preferences, recommendations, viewing history). As another example, the third content unit 116 can receive a navigation instruction from the first device 102 and/or second device 106. The navigation instruction can instruct the third device 114 to tune to or otherwise access specific content. By way of illustration, a user can access a link or button on the second device 106 requesting that the third device 114 be directed to particular content. In response, the first device 102 and/or second device 106 can provide the instruction across the network 102 to the third device 114. Upon receipt of the instruction, the third device 114 can tune and/or access the content indicated in the instruction.

Figure 2:
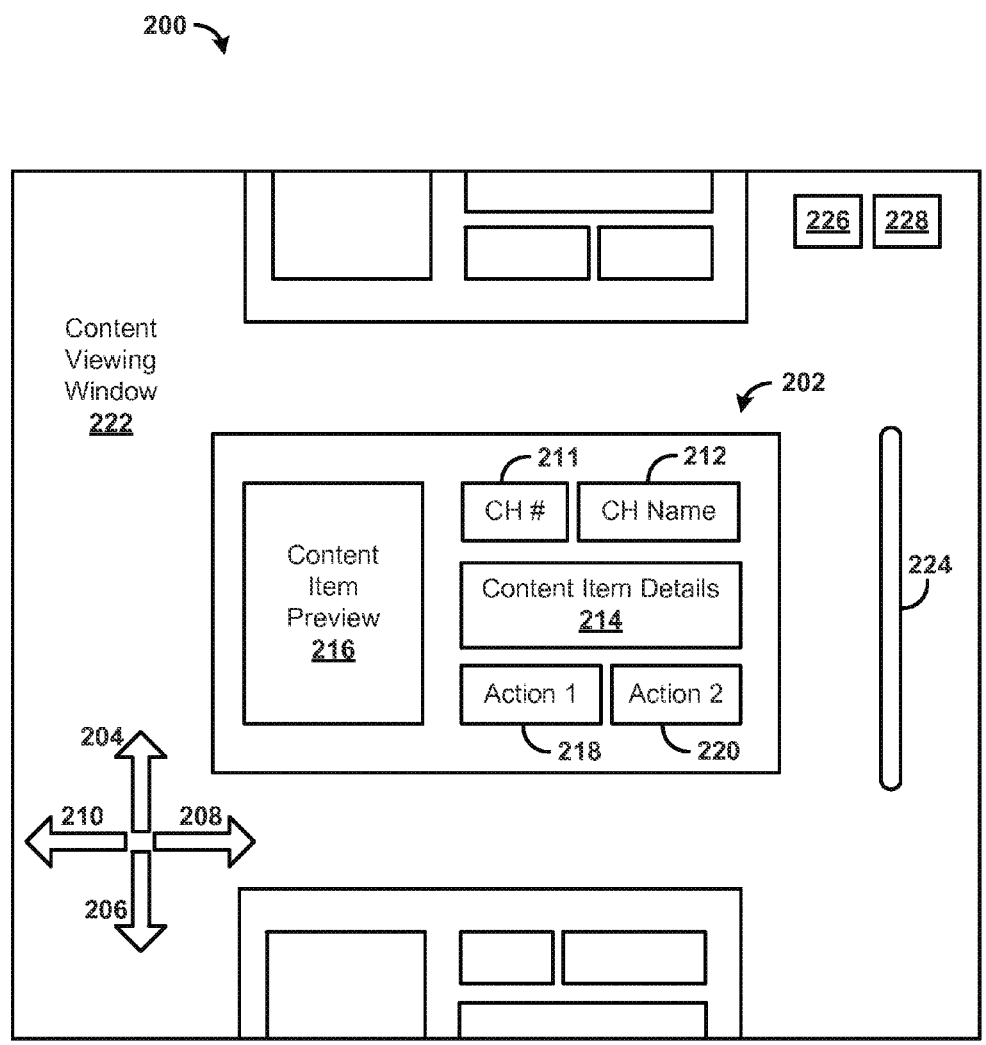
FIG. 2 is a diagram illustrating an example interface for providing content.

FIG. 2 is a diagram illustrating an example interface 200 for providing content. In one aspect, the interface 200 can comprise a sequence of navigation tiles 202. The navigation tiles 202 can be configured to scroll in a variety of directions, such as a first direction 204 (e.g., up), a second direction 206 (e.g., down), a third direction 208 (e.g., right), and/or a fourth direction 210 (e.g., left). For example, in FIG. 2, the example sequence of navigation tiles can scroll in the first direction 204 and/or second direction 206. It should be noted that other directions and angles are contemplated. For example, the navigation tiles 220 can be configured to scroll in any direction and/or angle in a multi-dimensional space (e.g., three-dimensional). As a further example, navigational tiles 220 can be configured to scroll into the page, out of the page, or any other direction in a multi-dimensional space.

In one aspect, a navigation tile 202 can comprise a variety of information related to a content item. For example, a navigation tile can comprise a channel identifier (e.g., source identifier), such as a channel number 211, a channel name 212 (e.g., or logo), and/or other channel or content collection identifier. A navigation tile 202 can comprise content item details 214, such as a title, time slot, episode, and/or other information relevant to the content item. In one aspect, a navigation tile 202 can comprise a content item preview box 216. The content item preview box 216 can comprise an image or video representative of a content item. In one aspect, the navigation tile 202 can comprise a button and/or the like configured to instruct the interface 200 to perform an action. For example, the navigation tile 202 can comprise a first action 218 and/or a second action 220. The first action 218 can instruct the interface 200 to initiate a recording of the content item. For example, the first action 218 can cause the interface to provide an instruction to a recording device to record at least a portion of the content item. The second action 220 can instruct the interface 200 to access the content item on a device, such as the device running the interface or a remote device (e.g., set-top box).

In one aspect, the interface 200 can comprise a content viewing window 222 configured to provide content to a user. The content viewing window 222 can be below or behind the sequence of navigation tiles 202. In one aspect, the content viewing window 222 can display currently selected content, such as content from a navigation tile 202. In another aspect, the content viewing window 222 can display the last selected content, such as content the user was accessing before accessing the sequence of navigation tiles.

In one aspect, the interface 200 can comprise a scroll bar 224 configured to facilitate scrolling of the navigation tiles. The scroll bar 224 can be configured to provide advanced scrolling features. For example, the scroll bar 224 can be configured provide scrolling at variable speeds. The speed of the scrolling can be based on the proximity of the user interaction (e.g., swipe, scroll) to the scroll bar. For example, the further the user interaction is from the scroll bar 224, the faster the navigation tiles 202 can be scrolled. As another example, the closer the user interaction is to the scroll bar, the faster the navigation tiles 202 can be scrolled.

Figure 4:
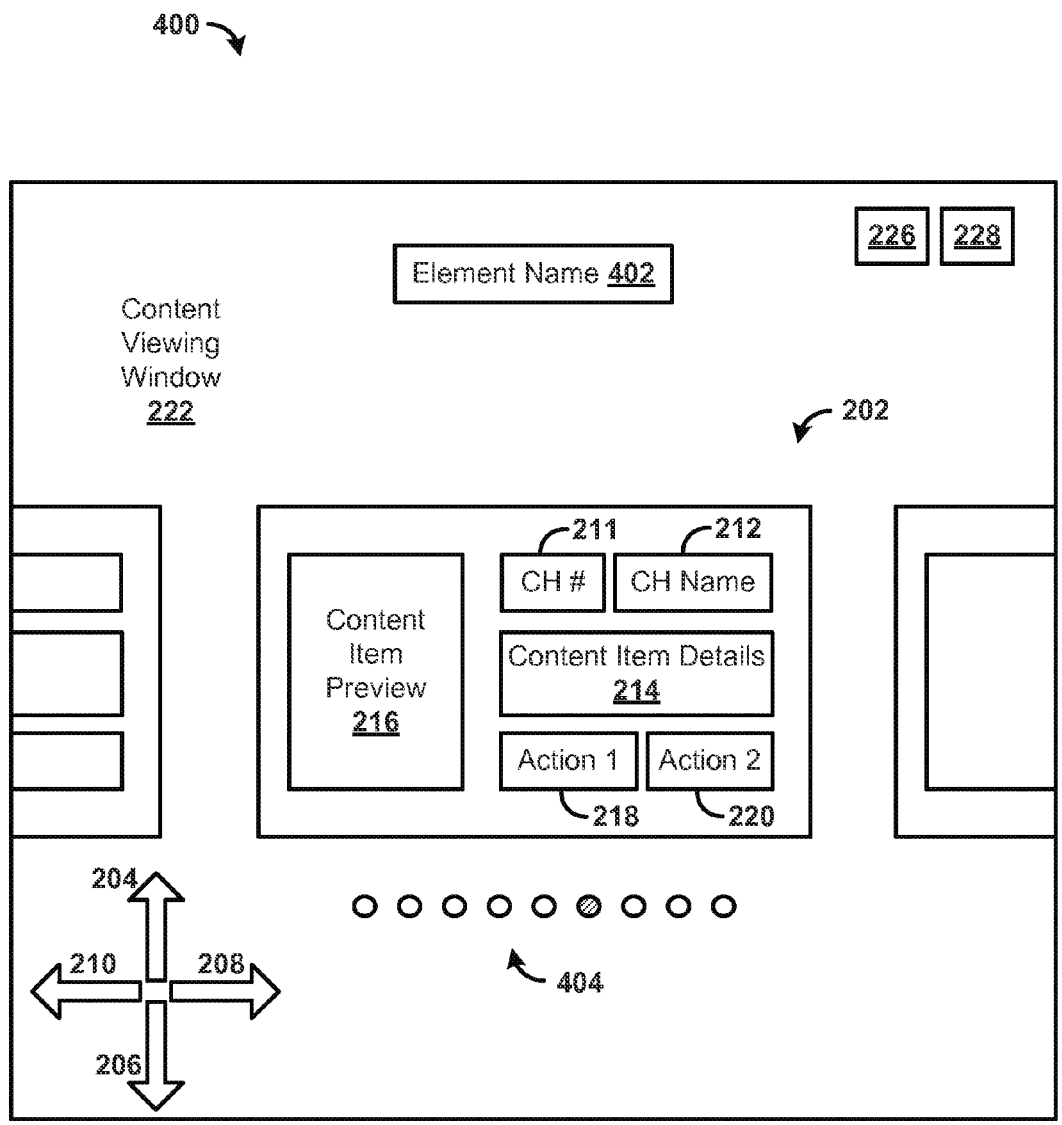
FIG. 4 is a diagram illustrating yet another example interface for providing content.

In one aspect, the interface 200 can comprise interface element selection buttons 226 and 228. For example, the interface element selection buttons 226 and 228 can be configured to allow a user to manually select specific interface elements. For example, button 226 can select a first element comprising a sequence of content selected (e.g., grouped) based on user information (e.g., recommendations, viewing history, user preferences, social media content, and/or the like). Button 228 can select a second element comprising a sequence of available content (e.g., content channels or content sources). In one aspect, the first element can also be selected when a user interaction matches a first direction, and the second element can also be selected when a user interaction matches a second direction. It should be noted that FIG. 2 illustrates an interface 200 with the second element provided to the user. FIG. 4 illustrates the interface when a first element is provided to a user.

Figure 3:
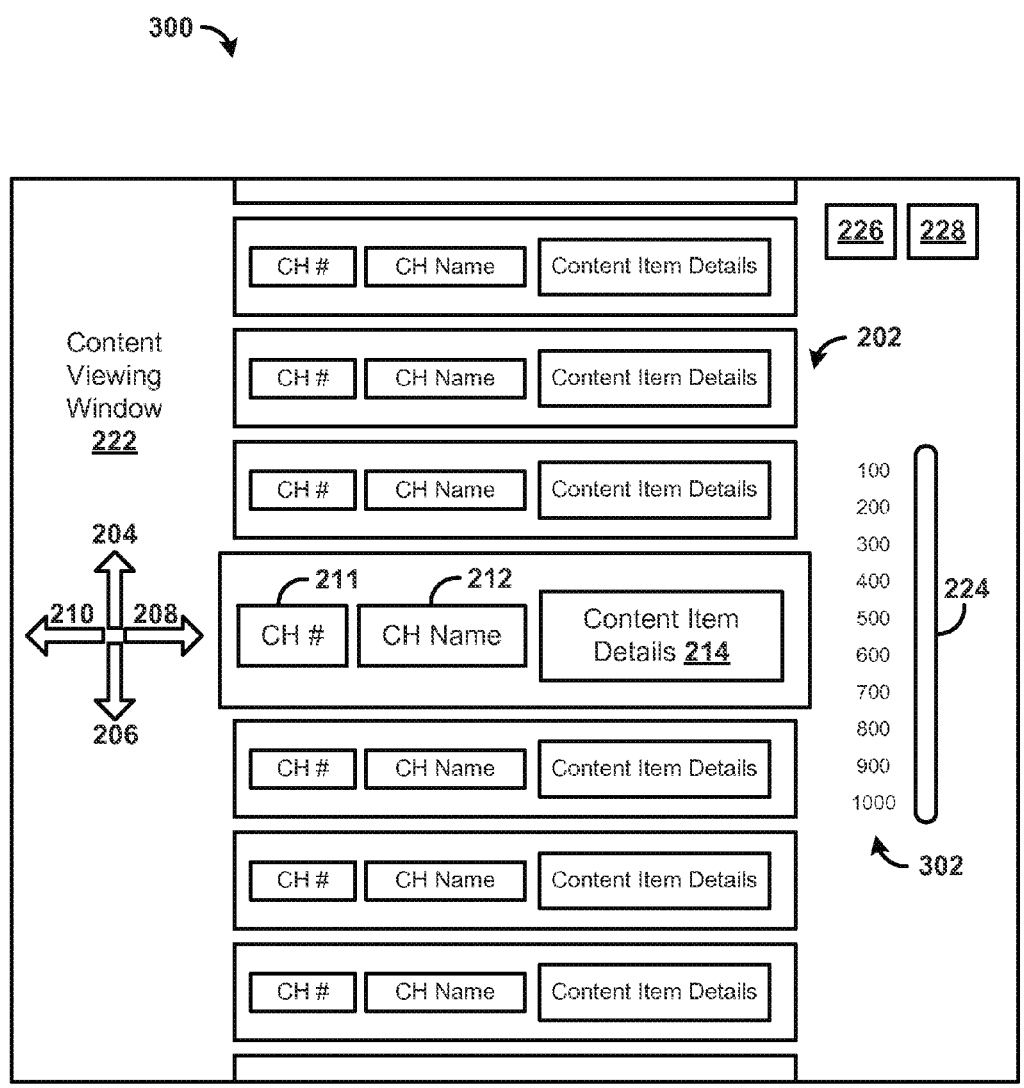
FIG. 3 is a diagram illustrating another example interface for providing content.

FIG. 3 is a diagram illustrating another example interface 300 for providing content. In one aspect, the example interface 300 can comprise the interface 200 of FIG. 2. For example, the example interface 300 illustrates an example fast scrolling mode of the sequence of navigation tiles 202 of the interface 200 of FIG. 2. In fast scrolling mode, the navigation tiles 202 can be displayed in a condensed form. For example, the channel number 211 and channel name 212, and content item details 214 can be displayed on the condensed navigation tile 202. The content item preview 216, and actions 218 and 220 as shown in FIG. 2 can be omitted from the condensed form of the navigation tile 202. In one aspect, when the interface 300 is in fast scrolling mode a greater number of navigation tiles 202 can be displayed at the same time than the number of navigation tiles shown in regular scrolling mode shown in FIG. 2.

In another aspect, the interface 300 can comprise a channel number index 302. The channel number index 302 can indicate positions on the scroll bar corresponding to navigation tiles with a specific channel number. For example, if a user provides a gesture, such as a finger swipe, that ends on the number "800" then the interface will show at least a navigation tile for a channel number within the range of 800 and 900. The channel number index 302 can allow a user to quickly identify and scroll to a desired range of channels.

FIG. 4 is a diagram illustrating yet another example interface 400 for providing content. In one aspect, the interface 400 can be configured to display an interface element. The interface element can be configured to scroll in at least one of the third direction 208 and fourth direction 210. For example, the interface element can comprise a sequence of navigation tiles 202. The navigation tiles 202 can be formatted in the same or similar way as the navigation tiles 202 of FIG. 2. For example, if the content items displayed by the navigation tiles of FIG. 4 are associated with a live content channel (e.g., television channel, content stream, content source), then the channel number 211 and channel name 212 can be displayed, as shown in FIG. 4. In some scenarios, however, the channel number 211 and channel name 212 can be omitted (e.g., when the content item is not or is no longer associated with a live content channel). In one aspect, a navigation tile 202 can comprise content item details 214 that are the same or similar to the content item details of FIG. 2. In one aspect, the information provided in the content item details 214 can vary according to the interface element provided. For example, if the interface element is a content viewing history, the content item details 214 can indicate how much of the show remains that a user has yet to watch. In one aspect, one or more of the actions 218 and 220 can be updated based on the type of content item. For example, action 218 can comprise an action to resume content that has already been partially watched. Action 220 can be an action to resume access to content another device such as a set-top box or television.

In one aspect, the interface 400 can comprise an element name 402. For example, the element name 402 can indicate the interface element activated by the user. Example interface elements can comprise a viewing history element, a recommendation element, a user preferences element, a content recording element, a social media element, and the like. As an illustration, when the viewing history element is displayed, the element name 402 can display "Previously Watched," "Viewing History," or some other similar title.

In one aspect, the interface element displayed in FIG. 4 can be activated (e.g., loaded, displayed) when a user instruction is received from the interface 200 of FIG. 2. For example, the interface 400 can be activated if the user instruction received from the interface 200 of FIG. 2 matches at least one of the third direction 208 and fourth direction 210. As another example, the interface 400 can be activated if the user presses an interface element selection button 228 on the interface 200 of FIG. 2. A user can return to the interface 200 of FIG. 2 by pressing the interface element selection button 226.

In one aspect, the interface 400 can comprise a navigation tile selector 404. The navigation tile selector 404 can be configured to indicate one or more navigation tiles 202 as a symbol, such as a circle, in a sequence of symbols. The symbols can be provided in order to select a corresponding navigation tile 202. In one aspect, the symbol representing a currently selected navigation tile 202 can be illuminated, filled, high-lighted and/or otherwise indicated (e.g., shown as diagonal lines inside the symbol).

Figure 5:
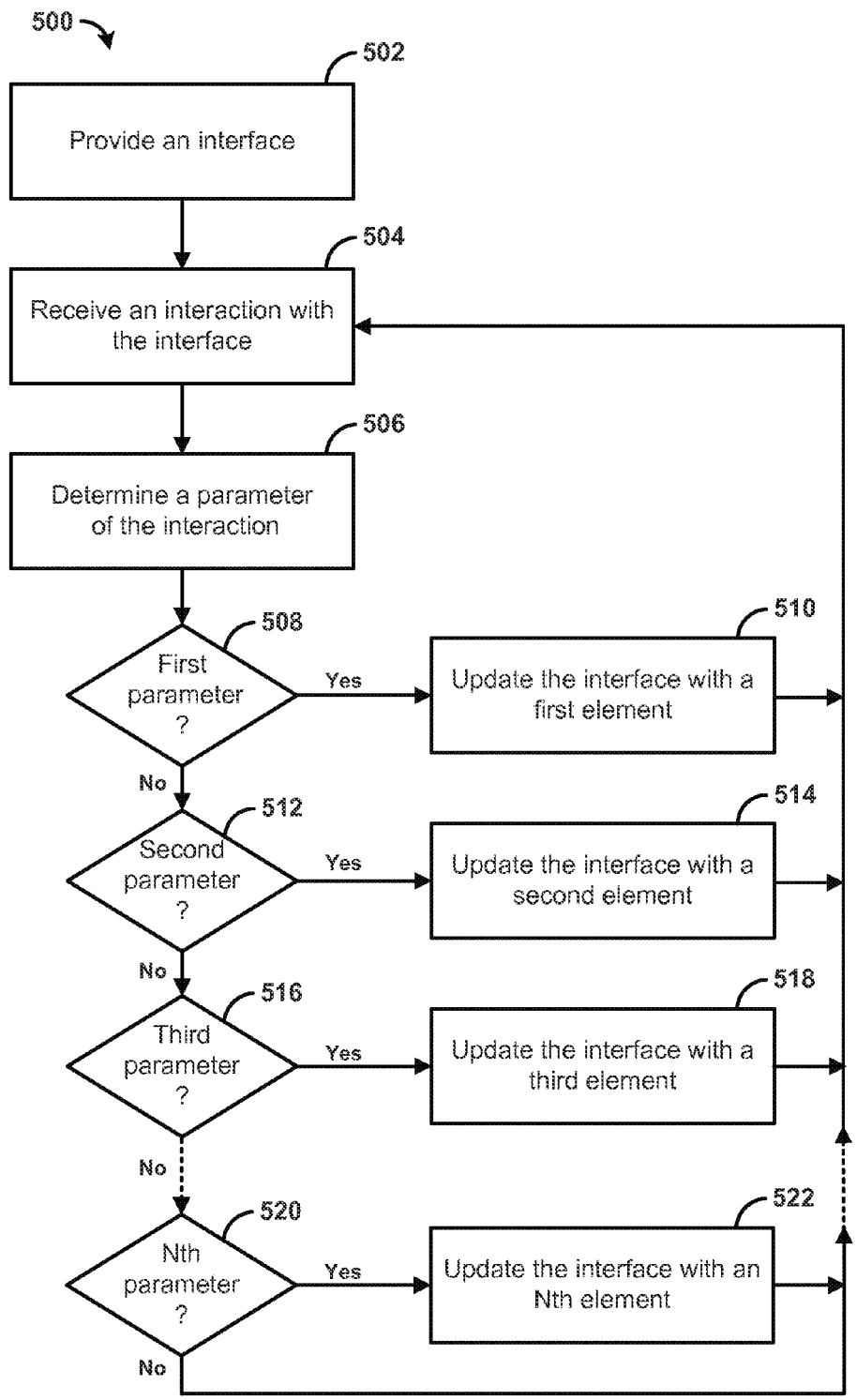
FIG. 5 is a flowchart illustrating an example method for providing content.

FIG. 5 is a flowchart illustrating an example method 500 for providing content. At step 502, an interface can be provided (e.g., accessed locally or remotely, downloaded or streamed to a device, and/or the like). In one aspect, the interface can be provided on a touch screen of a mobile device, such as a tablet, smart phone, or other computing device. At step 504, an interaction with an interface can be received. For example, a signal indicative of an interaction with an interface can be received. The interaction can be identified based on the signal. For example, the interaction can comprise at least one of a swipe, gesture, a scroll, slide, press of a button, spatial movement (e.g., orientation, rotation, up, down, shake) of a device, and/or the like. The interaction can be by a user. At step 506, the direction of the interaction can be determined. For example, one or more parameters (e.g., orientation, direction, length, angle, duration, velocity, magnitude, intensity) can be determined based on the movement of an object (e.g., finger, stylus) across a touch screen or other field. The one or more parameters can be used to determine the direction of the interaction and/or other information.

At step 508, a parameter (e.g., or orientation relative to another direction or orientation, and/or other parameter) of the interaction can be compared to a first parameter. For example, a direction of the interaction can be compared to a first direction. If the parameter of the interaction matches (e.g., within a threshold) the first parameter, then the method 500 can proceed to step 510. For example, if the direction of the interaction is in (e.g., matches) the first direction, then the method 500 can proceed to step 510. The direction of the interaction can be in the first direction if the direction of the interaction is within a threshold angle from the first direction. For example, the threshold angle can be 5, 10, 20, 30, 45 degrees or the like. If the parameter of the interaction does not match the first parameter, then the method 500 can proceed to step 512. For example, if the direction of the interaction is not in the first direction, then the method 500 can proceed to step 512.

At step 510, the interface can be updated with a first element. The first element can provide information (e.g., data, content) based on user data. For example, the first element can comprise at least one of a viewing history element, a recommendation element, a user preferences element, a content recording element, a social media element, and/or the like.

In one aspect, updating the interface with the first element can comprise displaying a sequence of at least one navigation tile. In one aspect, the first element can operate (e.g., scroll, pinch, zoom, twist, turn, click, press, morph, blend, sound, change, update) based on the first parameter. In one aspect, the first element can operate (e.g., scroll, pinch, zoom, twist, turn, click, press, morph, blend, sound, change, update) based on the first parameter. For example, the first element can scroll in the first direction. As a further example, the sequence of the at least one navigation tile can scroll in the first direction. In one aspect, at least one navigation tile can be displayed in a condensed view or an expanded view based on proximity of the interaction to a scroll element (e.g., scroll bar). For example, if the interaction is a threshold distance away from the scroll element, then the at least one navigation tile can be displayed in a condensed view. As another example, if the interaction is within a threshold distance from the scroll element, then the at least one navigation tile can be displayed in a condensed view. Otherwise, the at least one navigation tile can be displayed in an expanded view. As another example, a navigation tile of the at least one navigation tile and/or a window separate from (e.g., or beside, behind, proximate to) the navigation tile can be configured to display a video preview of content associated with the navigation tile. In one aspect, updating the interface with the first element can comprise replacing at least one of a current element provided by the interface and the second element with the first element.

At step 512, the parameter of the interaction can be compared to a second parameter. For example, the direction of the interaction can be compared to a second direction. In one aspect, the first direction can be perpendicular to the second direction. For example, the first direction can be one of a horizontal direction and a vertical direction. The second direction can be the other of the horizontal direction and the vertical direction. If the parameter of the interaction matches (e.g., within a threshold) the second parameter, then the method 500 can proceed to step 514. For example, if the direction of the interaction is in (e.g., matches) the second direction, then the method 500 can proceed to step 514. The direction of the interaction can be in the second direction if the direction of the interaction is within a threshold angle from the second direction. For example, the threshold angle can be 5, 10, 20, 30, 45 degrees or the like. If the parameter of the interaction does not match second parameter, then the method 500 can proceed to step 516. For example, if the direction of the interaction is not in the second direction, then the method 500 can proceed to step 516.

At step 514, the interface can be updated with a second element. For example, the second element can provide information based on content guide data, such as an electronic program guide data. For example, the second element can provide access to a plurality of content channels (e.g., television channels, content sources). In one aspect, updating the interface with the second element can comprise displaying a sequence of at least one navigation tile. The second element can operate (e.g., scroll, pinch, zoom, twist, turn, click, press, morph, blend, sound, change, update) based on the second parameter. For example, the second element can scroll in the second direction. As a further example, the sequence of the at least one navigation tile can scroll in the second direction. In one aspect, at least one navigation tile can be displayed in a condensed view or an expanded view based on proximity of the interaction to a scroll element (e.g., scroll bar). For example, if the interaction is a threshold distance away from the scroll element, then the at least one navigation tile can be displayed in a condensed view. As another example, if the interaction is within a threshold distance from the scroll element, then the at least one navigation tile can be displayed in a condensed view. Otherwise, the at least one navigation tile can be displayed in an expanded view. A navigation tile of the at least one navigation tile and/or a window separate from (e.g., or beside, behind, proximate to) the navigation tile can be configured to display a video preview of content associated with the navigation tile. In one aspect, updating the display with the second element can comprise replacing at least one of the current element and the first element with the second element.

At step 516, the parameter of the interaction can be compared to a third parameter. For example, the direction of the interaction can be compared to a third direction. In one aspect, the third direction can be opposite to the first direction or second direction. If the parameter of the interaction matches (e.g., within a threshold) the third parameter, then the method 500 can proceed to step 518. For example, if the direction of the interaction is in (e.g., matches) the third direction, then the method 500 can proceed to step 518. The direction of the interaction can be in the third direction if the direction of the interaction is within a threshold angle from the third direction. For example, the threshold angle can be 5, 10, 20, 30, 45 degrees or the like. If the parameter of the interaction does not match the third parameter, then the method 500 can proceed to step 520. For example, if the direction of the interaction is not in the third direction, then the method 500 can proceed to step 520.

At step 518, the interface can be updated with a third element. In some implementations, the parameter of the interaction can be compared to a plurality of additional parameters. For example, the direction of the interaction can be compared to a plurality of additional directions. At step 520, the parameter of the interaction can be compared to an Nth parameter, where N is any suitable number. For example, at step 520, the direction of the interaction can be compared to an Nth direction, where N is any suitable number. If the parameter of the interaction matches (e.g., within a threshold) the Nth parameter, then the method 500 can proceed to step 522. For example, if the direction of the interaction is in the Nth direction, then the method 500 can proceed to step 522. The direction of the interaction can be in the Nth direction if the direction of the interaction is within a threshold angle from the Nth direction. For example, the threshold angle can be 5, 10, 20, 30, 45 degrees or the like. If the parameter of the interaction does not match the Nth parameter, then the method 500 can return to step 504. For example, if the direction of the interaction does not match the Nth direction, then the method 500 can return to step 504. At step 522, the interface can be updated with an Nth element. The method 500 can then return to step 504.

Figure 6:
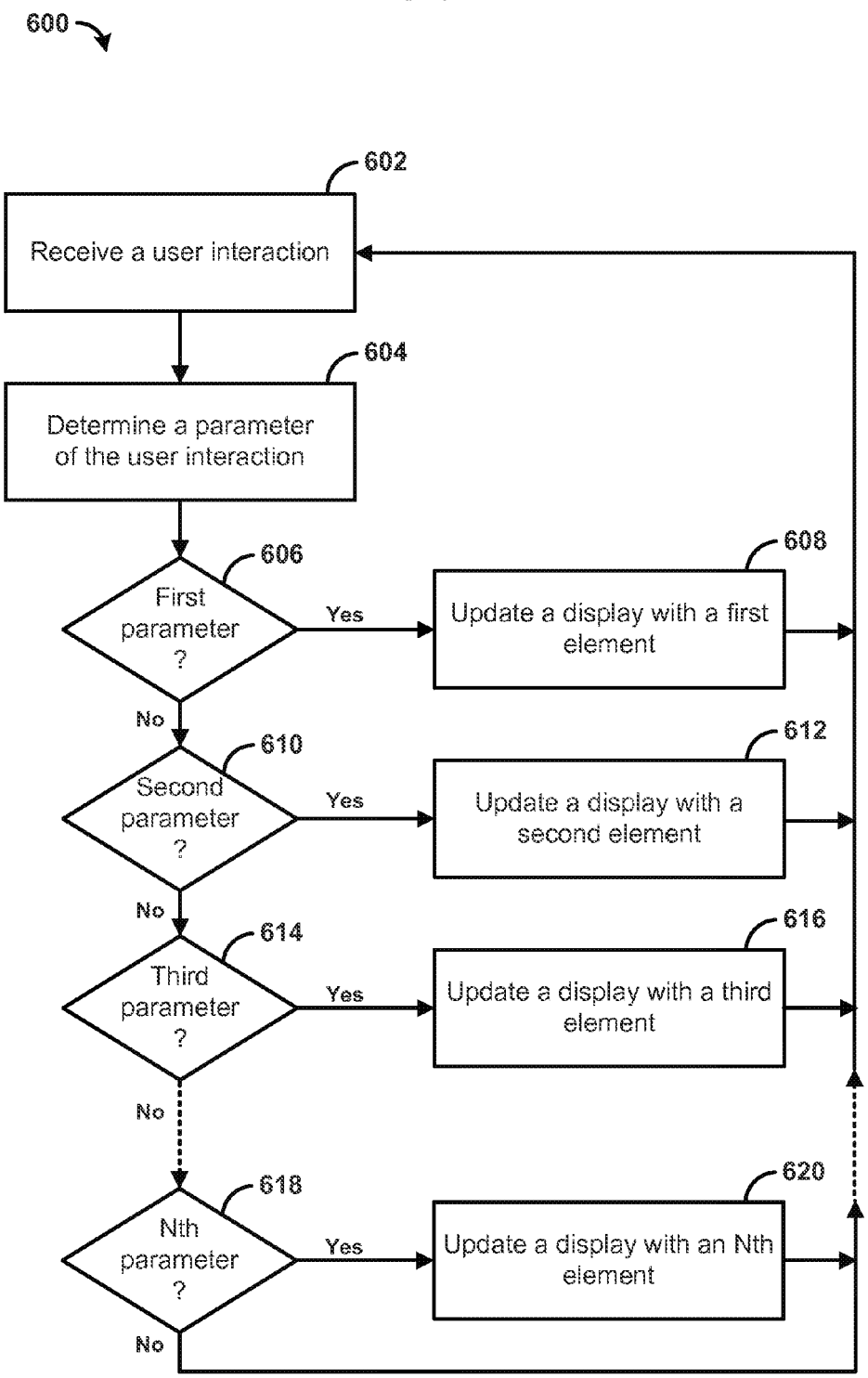
FIG. 6 is a flowchart illustrating another example method for providing content.

FIG. 6 is a flowchart illustrating another example method 600 for providing content. At step 602, a user interaction can be received. For example, a signal indicative of a user interaction can be received. The user interaction can be identified based on the signal. For example, the user interaction can comprise at least one of a swipe, a scroll, a slide, a press of a button, spatial movement (e.g., orientation, rotation, up, down, shake) of a device, and/or the like. At step 604, a parameter of the interaction can be determined. For example, the direction of the interaction can be determined. For example, one or more parameters (e.g., orientation, direction, length, angle, duration, velocity, intensity, magnitude) can be determined based on the movement of an object (e.g., finger, stylus) across a touch screen or other field. The one or more parameters can be used to determine the direction of the interaction and/or other information.

At step 606, the parameter can be compared to a first parameter. For example, the direction can be compared to a first direction. If the parameter matches (e.g., within a threshold) the first parameter, then the method 600 can proceed to step 608. For example, if the direction is in (e.g., matches) the first direction, then the method 600 can proceed to step 608. The direction is in the first direction if the direction is within a threshold angle from the first direction. For example, the threshold angle can be 5, 10, 20, 30, 45 degrees or the like. If the parameter does not match the first parameter, then the method 600 can proceed to step 610. For example, if the direction is not in the first direction, then the method 600 can proceed to step 610.

At step 608, a display can be updated with a first element. In one aspect, the first element can comprise at least one of a viewing history element, a recommendation element, a user preferences element, a content recording element, a social media element, a content browsing element, and/or the like. In one aspect, updating the display with the first element can comprise displaying a sequence of at least one navigation tile. In one aspect, the first element can operate (e.g., scroll, pinch, zoom, twist, turn, click, press, morph, blend, sound, change, update) based on the first direction. For example, the first element can scroll in the first direction. As a further example, the sequence of the at least one navigation tile can scroll in the first direction. In one aspect, a navigation tile of the at least one navigation tiles and/or a window separate from (e.g., or beside, behind, proximate to) the navigation tile can be configured to display a video preview of content associated with the navigation tile. In another aspect, updating the display with the first element can comprise rendering at least one navigation tile in a condensed view or an expanded view based on proximity of the user interaction to a scroll element (e.g., scroll bar). For example, if the user interaction is a threshold distance away from the scroll element, then the at least one navigation tile can be displayed in a condensed view. As another example, if the user interaction is within a threshold distance from the scroll element, then the at least one navigation tile can be displayed in a condensed view. Otherwise, the at least one navigation tile can be displayed in an expanded view. In one aspect, updating the display with the first element can comprise replacing at least one of a current element provided to the display and the second element with the first element.

At step 610, the parameter can be compared to a second parameter. For example, the direction can be compared to a second direction. In one aspect, the first direction can be perpendicular to the second direction. For example, the first direction can be one of a horizontal direction and a vertical direction. The second direction can be the other of the horizontal direction and the vertical direction. If the parameter matches (e.g., within a threshold) the second parameter, then the method 600 can proceed to step 612. For example, if the direction is in (e.g., matches) the second direction, then the method 600 can proceed to step 612. The direction is in the second direction if the direction is within a threshold angle from the second direction. For example, the threshold angle can be 5, 10, 20, 30, 45 degrees or the like. If the parameter does not match the second parameter, then the method 600 can proceed to step 614. For example, if the direction does not match the second direction, then the method 600 can proceed to step 614.

At step 612, the display can be updated with a second element. The second element can be different than the first element. In one aspect, the second element can provide information based on content guide data (e.g., electronic program guide data) and/or user information. The second element can comprise at least one of a viewing history element, a recommendation element, a user preferences element, a content recording element, a social media element, a content browsing element, and/or the like. In one aspect, updating the display with the second element can comprise rendering a sequence of at least one navigation tile. In one aspect, a navigation tile of the at least one navigation tiles and/or a window separate from (e.g., or beside, behind, proximate to) the navigation tile can be configured to display a video preview of content associated with the navigation tile. In one aspect, the second element can operate (e.g., scroll, pinch, zoom, twist, turn, click, press, morph, blend, sound, change, update) based on the second parameter. For example, the second element can scroll in the second direction. As a further example, the sequence of the at least one navigation tile can scroll in the second direction. In another aspect, updating the display with the second element can comprise rendering at least one navigation tile in a condensed view or an expanded view based on proximity of the user interaction to a scroll element (e.g., scroll bar). For example, if the user interaction is a threshold distance away from the scroll element, then the at least one navigation tile can be displayed in a condensed view. As another example, if the user interaction is within a threshold distance from the scroll element, then the at least one navigation tile can be displayed in a condensed view. Otherwise, the at least one navigation tile can be displayed in an expanded view. In another aspect, updating the display with the second element can comprise replacing at least one of the current element and the first element with the second element.

At step 614, the parameter can be compared to a third parameter. For example, the direction can be compared to a third direction. The third direction can be opposite to the first direction or second direction. If the parameter matches (e.g., within a threshold) the third parameter, then the method 600 can proceed to step 616. For example, if the direction is in (e.g., matches) the third direction, then the method 600 can proceed to step 616. The direction is in the third direction if the direction is within a threshold angle from the third direction. For example, the threshold angle can be 5, 10, 20, 30 degrees or the like. If the parameter does not match the third parameter, then the method 600 can proceed to step 618. For example, if the direction is not in the third direction, then the method 600 can proceed to step 618.

At step 616, the display can be updated with a third element. In one aspect, the third element can be different than the first element, and/or second element. The third element can comprise at least one of a viewing history element, a recommendation element, a user preferences element, a content recording element, a social media element, a content browsing element, and/or the like. In some implementations, the parameter can be compared to a plurality of additional parameters. For example, the direction can be compared to a plurality of additional directions. At step 618, the parameter can be compared to an Nth parameter, where N is any suitable number. For example, at step 618, the direction can be compared to an Nth direction, where N is any suitable number. If the parameter matches (e.g., within a threshold) the Nth parameter, then the method 600 can proceed to step 620. For example, if the direction is in (e.g., matches) the Nth direction, then the method 600 can proceed to step 620. The direction is in the Nth direction if the direction is within a threshold angle from the Nth direction. For example, the threshold angle can be 5, 10, 20, 30, 45 degrees or the like. If the parameter does not match the Nth parameter, then the method 600 can return to step 602. For example, if the direction does not match the Nth direction, then the method 600 can return to step 602. At step 620, the display can be updated with an Nth element. In one aspect, the Nth element can be different than one or more other elements, such as the first element, second element, and/or third element. The method 600 can then return to step 602.

Figure 7:
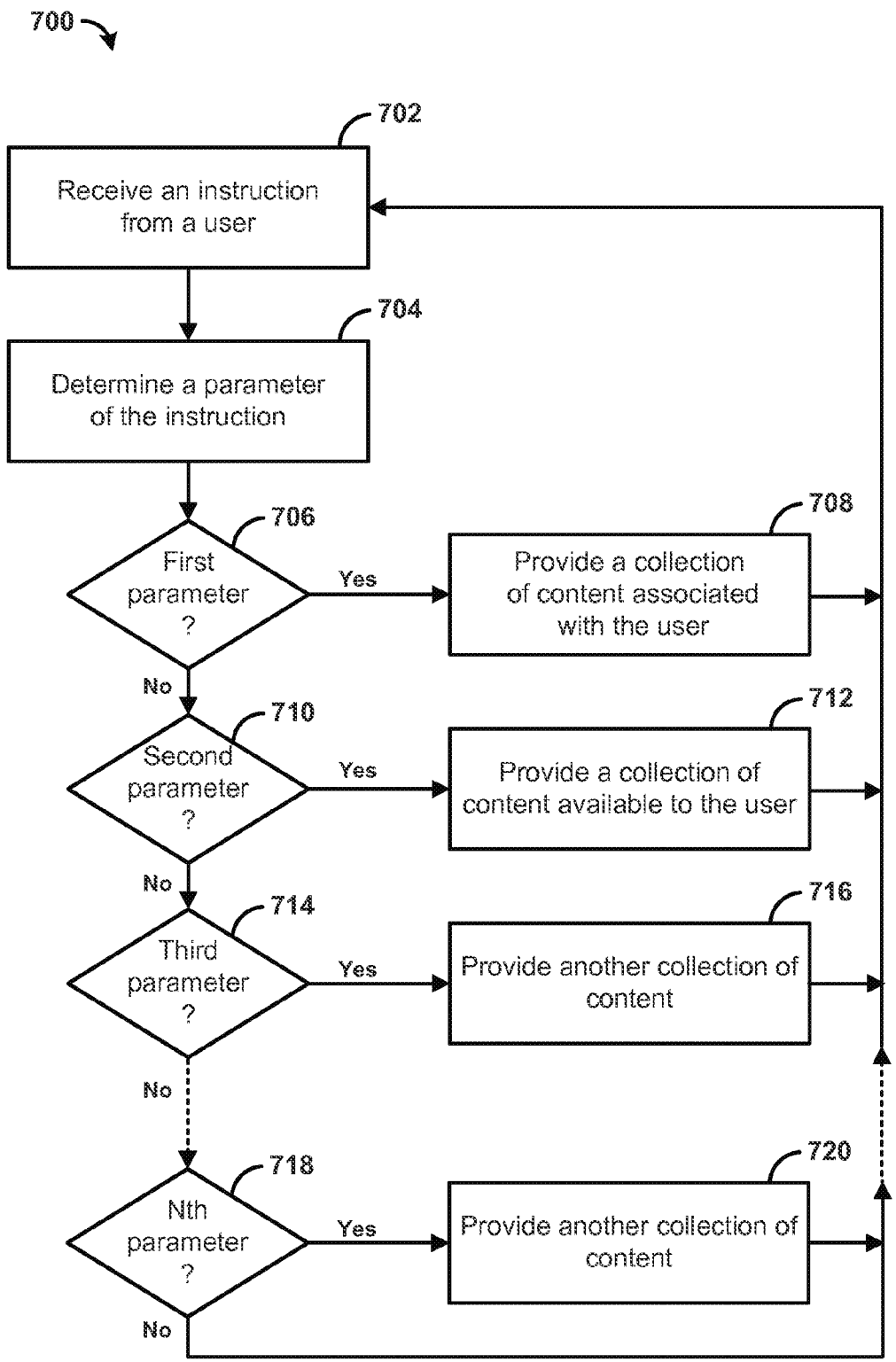
FIG. 7 is a flowchart illustrating yet another example method for providing content.

FIG. 7 is a flowchart illustrating yet another example method 700 for providing content. At step 702, an instruction can be received from a user. As an illustration, a signal indicative of the instruction can be received. The signal can be received in response to the user interacting with (e.g. touching, pressing) a device, such as a display, pointer, directional element (e.g., arrow button). For example, the instruction from the user can comprise at least one of a swipe, a scroll, a slide, a press of a button, spatial movement (e.g., orientation, rotation, up, down, shake) of a device, and/or the like. At step 704, a parameter of the instruction can be determined. For example, a direction of the instruction can be determined. For example, one or more parameters (e.g., orientation, direction, length, angle, duration, velocity, intensity, magnitude) can be determined based on the movement of an object (e.g., finger, stylus) across a touch screen or other field. The one or more parameters can be used to determine the direction of the interaction and/or other information.

At step 706, it can be determined whether the instruction is associated with a first parameter. The instruction can be associated with the first parameter if the parameter determined at step 704 matches or is otherwise logically associated with the first parameter. For example, it can be determined whether the instruction is associated with a first direction. If the instruction is associated with the first parameter, then the method 700 can proceed to step 708. For example, if the instruction is associated with the first direction, then the method 700 can proceed to step 708. In one aspect, the instruction can be associated with the first direction if the direction is within a threshold angle from the first direction. For example, the threshold angle can be 5, 10, 20, 30, 45 degrees or the like. In another aspect, the instruction can be associated with the first direction based on a predefined association of an instruction or type of instruction with the first direction. If the instruction is not associated with the first parameter, then the method 700 can proceed to step 710. For example, if the instruction is not associated with the first direction, then the method 700 can proceed to step 710.

At step 708, a collection of content associated with the user based on a relevancy criterion can be provided. The relevancy criterion can comprise at least one of viewing history associated with the user, recommendations associated with the user, preferences associated with the user, content recordings associated with the user, social media associated with the user, and/or the like. The collection of content associated with the user can comprise at least one of a viewing history collection, a recommendation collection, a user preferences collection, a content recording collection, a social media collection, and/or the like.

In one aspect, providing the collection of content associated with the user based on a relevancy criterion can comprise displaying a sequence of at least one navigation tile. In one aspect, the collection of content can operate (e.g., scroll, pinch, zoom, twist, turn, click, press, morph, blend, sound, change, update) based on the first direction. For example, the collection of content associated with the user can scroll in the first direction. As another example, the sequence of the at least one navigation tile can scroll in the first direction. Providing the collection of content associated with the user can comprise displaying at least one navigation tile in a condensed view or an expanded view based on proximity of the instruction to a scroll element (e.g., scroll bar). For example, if the interaction is a threshold distance away from the scroll element, then the at least one navigation tile can be displayed in a condensed view. As another example, if the interaction is within a threshold distance from the scroll element, then the at least one navigation tile can be displayed in a condensed view. Otherwise, the at least one navigation tile can be displayed in an expanded view. A navigation tile of the at least one navigation tile or a window separate from (e.g., beside, behind, proximate to) the navigation tile can be configured to display a video preview of content associated with the navigation tile. In one aspect, providing the collection of content associated with the user can comprise replacing at least one of a current collection of content and the collection of content available to the user with the collection of content associated with the user.

At step 710, it can be determined whether the instruction is associated with a second parameter. The instruction can be associated with the second parameter if the parameter determined at step 704 matches or is otherwise logically associated with the second parameter. For example, it can be determined whether the instruction is associated with a second direction. In one aspect, the first direction can be perpendicular to the second direction. For example, the first direction can be one of a horizontal direction and a vertical direction. The second direction can be the other of the horizontal direction and the vertical direction. If the instruction is associated with the second parameter, then the method 700 can proceed to step 712. For example, if the instruction is associated with the second direction, then the method 700 can proceed to step 712. In one aspect, the instruction can be associated with the second direction if the direction is within a threshold angle from the second direction. For example, the threshold angle can be 5, 10, 20, 30, 45 degrees or the like. In another aspect, the instruction can be associated with the second direction based on a predefined association of an instruction or type of instruction with the second direction. If the instruction is not associated with the second parameter, then the method 700 can proceed to step 714. For example, if the instruction is not associated with the second direction, then the method 700 can proceed to step 714.

At step 712, a collection of content available to the user can be provided. For example, the collection of content available to the user can comprise a plurality of content channels (e.g., content source, television channel, and/or the like) available to the user based on at least one of a subscription and a payment. As a further example, the collection of content available to the user can be based on content guide data (e.g., electronic program guide data). In one aspect, the collection of content available to the user can comprise a collection of general content available to the user. General content can comprise content that is not selected based on a user's preferences. For example, general content can comprise content listed (e.g., for a current time) on a content guide, content associated with a subscription tier, popular or trending content, and/or the like.

In one aspect, providing the collection of content available to the user can comprise displaying a sequence of at least one navigation tile. In one aspect, the collection of content available to the user can operate (e.g., scroll, pinch, zoom, twist, turn, click, press, morph, blend, sound, change, update) based on the second parameter. In one aspect, the collection of content available to the user can scroll in the second direction. For example, the sequence of the at least one navigation tile can scroll in the second direction. Providing the collection of content available to the user can comprise displaying at least one navigation tile in a condensed view or an expanded view based on proximity of the instruction to a scroll element. For example, if the interaction is a threshold distance away from the scroll element, then the at least one navigation tile can be displayed in a condensed view. As another example, if the interaction is within a threshold distance from the scroll element, then the at least one navigation tile can be displayed in a condensed view. Otherwise, the at least one navigation tile can be displayed in an expanded view. A navigation tile of the at least one navigation tile or a window separate from (e.g., beside, behind, proximate to) the navigation tile can be configured to display a video preview of content associated with the navigation tile. In one aspect, providing the collection of content available to the user can comprise replacing at least one of the current collection of content and the collection of content associated with the user.

At step 714, it can be determined whether the instruction is associated with a third parameter. The instruction can be associated with the third parameter if the parameter determined at step 704 matches or is otherwise logically associated with the third parameter. At step 714, it can be determined whether the instruction is associated with a third direction. The third direction can be opposite to the first direction or second direction. If the instruction is associated with the third parameter, then the method 700 can proceed to step 716. For example, if the instruction is associated with the third direction, then the method 700 can proceed to step 716. In one aspect, the instruction can be associated with the third direction if the direction is within a threshold angle from the third direction. For example, the threshold angle can be 5, 10, 20, 30, 45 degrees or the like. In another aspect, the instruction can be associated with the third direction based on a predefined association of an instruction or type of instruction with the third direction. If the instruction is not associated with the third parameter, then the method 700 can proceed to step 718. For example, if the instruction is not associated with the third direction, then the method 700 can proceed to step 718.

At step 716, another collection of content associated with the user can be provided. The another collection of content associated with the user can comprise at least one of a viewing history collection, a recommendation collection, a user preferences collection, a content recording collection, a social media collection, and/or the like.

In some implementations, it can be determined whether the instruction is associated with one or more of a plurality of parameters. The instruction can be associated with the one or more of the plurality of parameters if the parameter determined at step 704 matches or is otherwise logically associated with the one or more plurality of parameters. For example, it can be determined for a plurality of additional directions whether the instruction is associated with an additional direction. At step 718, it can be determined if the instruction is associated with an Nth parameter, where N is any suitable number. For example, it can be determined if the instruction is associated with an Nth direction, where N is any suitable number. If the instruction is associated with the Nth parameter, then the method 700 can proceed to step 720. For example, if the instruction is associated with the Nth direction, then the method 700 can proceed to step 720. In one aspect, the instruction can be associated with the Nth direction if the direction is within a threshold angle from the Nth direction. For example, the threshold angle can be 5, 10, 20, 30, 45 degrees or the like. In another aspect, the instruction can be associated with the Nth direction based on a predefined association of an instruction or type of instruction with the Nth direction. If the instruction is not associated with the Nth parameter, then the method 700 can return to step 702. For example, if the instruction is not associated with the Nth direction, then the method 700 can return to step 702. At step 720, yet another collection of content (e.g., associated with or available to the user) can be provided. The method 700 can then return to step 702.

Figure 8:
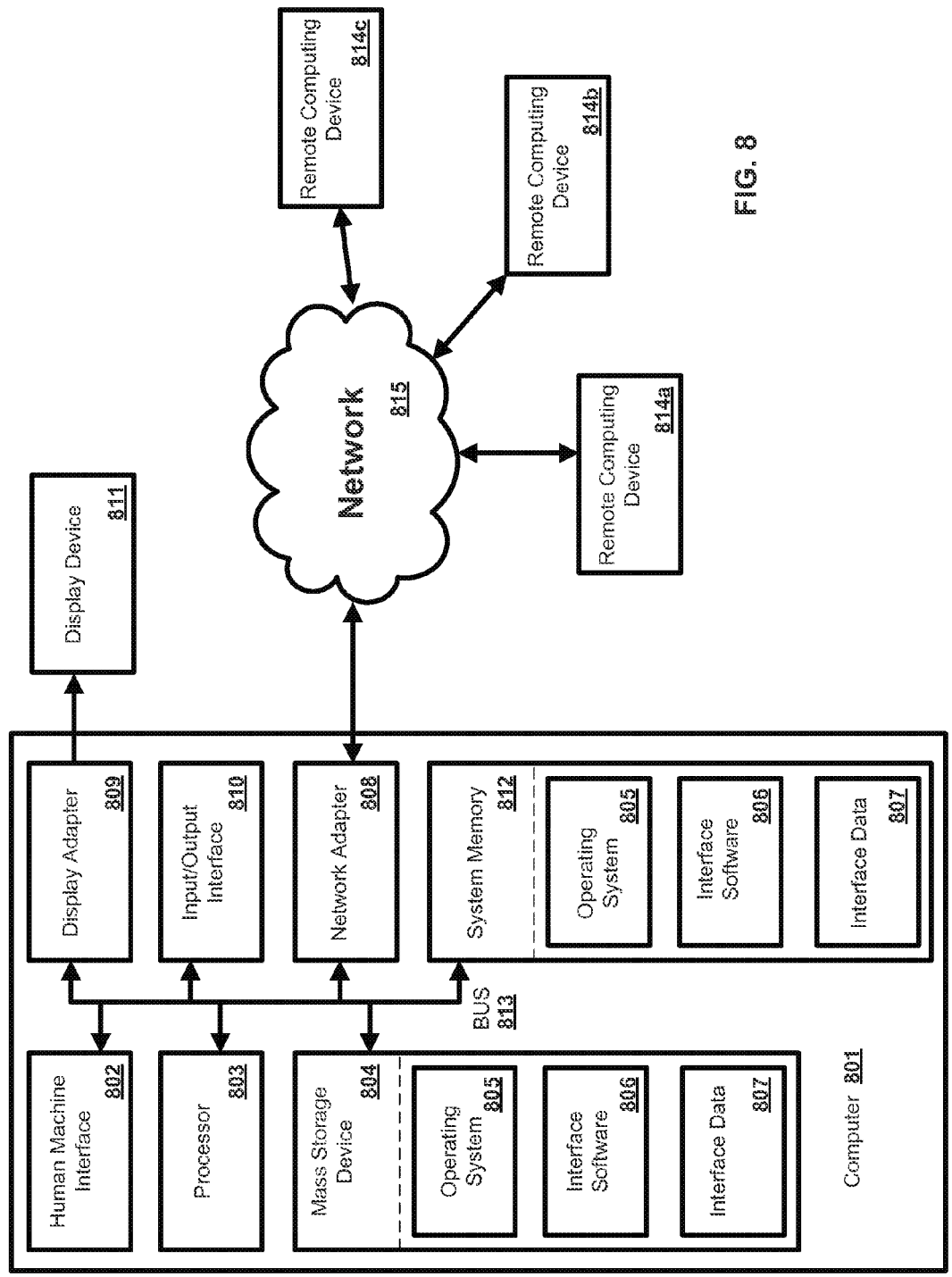
FIG. 8 is a block diagram illustrating an example computing system in which the present systems and methods can operate.

In an exemplary aspect, the methods and systems can be implemented on a computer 801 as illustrated in FIG. 8 and described below. By way of example, the first device 102, second device 106, and/or third device 114 of FIG. 1 can be a computer as illustrated in FIG. 8. Similarly, the methods and systems disclosed can utilize one or more computers to perform one or more functions in one or more locations. FIG. 8 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 801. The components of the computer 801 can comprise, but are not limited to, one or more processors or processing units 803, a system memory 812, and a system bus 813 that couples various system components including the processor 803 to the system memory 812. In the case of multiple processing units 803, the system can utilize parallel computing.

The system bus 813 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 813, and all buses specified in this description can also be implemented over a wired or wireless network connection and each of the subsystems, including the processor 803, a mass storage device 804, an operating system 805, interface software 806, interface data 807, a network adapter 808, system memory 812, an Input/Output Interface 810, a display adapter 809, a display device 811, and a human machine interface 802, can be contained within one or more remote computing devices 814*a,b,c* at physically separate locations, connected through buses of this form, in effect implementing a fully distributed system.

The computer 801 typically comprises a variety of computer readable media. Exemplary readable media can be any available media that is accessible by the computer 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as interface data 807 and/or program modules such as operating system 805 and interface software 806 that are immediately accessible to and/or are presently operated on by the processing unit 803.

In another aspect, the computer 801 can also comprise other removable/non-removable, volatile/non-volatile computer storage media. By way of example, FIG. 8 illustrates a mass storage device 804 which can provide non-volatile storage of computer code, computer readable instructions, data structures, program modules, and other data for the computer 801. For example and not meant to be limiting, a mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 804, including by way of example, an operating system 805 and interface software 806. Each of the operating system 805 and interface software 806 (or some combination thereof) can comprise elements of the programming and the interface software 806. Interface data 807 can also be stored on the mass storage device 804. Interface data 807 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 801 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 803 via a human machine interface 802 that is coupled to the system bus 813, but can be connected by other interface and bus structures, such as a parallel port, game port, an IEEE 1394 Port (also known as a Firewire port), a serial port, or a universal serial bus (USB).

In yet another aspect, a display device 811 can also be connected to the system bus 813 via an interface, such as a display adapter 809. It is contemplated that the computer 801 can have more than one display adapter 809 and the computer 801 can have more than one display device 811. For example, a display device can be a monitor, an LCD (Liquid Crystal Display), or a projector. In addition to the display device 811, other output peripheral devices can comprise components such as speakers (not shown) and a printer (not shown) which can be connected to the computer 801 via Input/Output Interface 810. Any step and/or result of the methods can be output in any form to an output device. Such output can be any form of visual representation, including, but not limited to, textual, graphical, animation, audio, tactile, and the like. The display 811 and computer 801 can be part of one device, or separate devices.

The computer 801 can operate in a networked environment using logical connections to one or more remote computing devices 814a,b,c. By way of example, a remote computing device can be a personal computer, portable computer, smartphone, a server, a router, a network computer, a peer device or other common network node, and so on. Logical connections between the computer 801 and a remote computing device 814a,b,c can be made via a network 815, such as a local area network (LAN) and/or a general wide area network (WAN). Such network connections can be through a network adapter 808. A network adapter 808 can be implemented in both wired and wireless environments. Such networking environments are conventional and commonplace in dwellings, offices, enterprise-wide computer networks, intranets, and the Internet.

For purposes of illustration, application programs and other executable program components such as the operating system 805 are illustrated herein as discrete blocks, although it is recognized that such programs and components reside at various times in different storage components of the computing device 801, and are executed by the data processor(s) of the computer. An implementation of interface software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
providing, by a computing device, an electronic program guide comprising:
a plurality of navigation tiles, wherein each of the plurality of navigation tiles is associated with a respective content item, wherein each of the plurality of navigation tiles comprises respective content related information associated with the respective content item,
a scroll element configured to scroll through the plurality of navigation tiles at a variable speed, wherein the variable speed is based on one or more of a scroll mode associated with the scroll element or a proximity of an interaction to the scroll element, and
a channel number index associated with the scroll element;

receiving a signal indicating an interaction with the electronic program guide; and
based on the interaction being in a first direction, updating the electronic program guide with a first navigation tile of the plurality of navigation tiles, wherein the first navigation tile comprises:
first respective content related information of a first respective content item associated with the first navigation tile, wherein the first respective content related information comprises one or more of a viewing history element or a recommendation element, and
a preview of the first respective content item associated with the first navigation tile.

2. The method of claim 1 further comprising, updating, based on the interaction being in a second direction, the electronic program guide with a second navigation tile of the plurality of navigation tiles, wherein the second navigation tile comprises:
second respective content related information, wherein the second respective content related information is associated with the user, and wherein the second respective content related information comprises, based on the user, one or more of another viewing history element, another recommendation element, or a content recording element.

3. The method of claim 2, further comprising
varying the size of the second navigation tile based on the interaction in the second direction.

4. The method of claim 2, wherein the first direction is perpendicular to the second direction.

5. The method of claim 1, wherein updating the electronic program guide with the first navigation tile comprises displaying, on a display device, the first navigation tile.

6. The method of claim 5, wherein a window separate from the first navigation tile is configured to display the preview of the first respective content item associated with the first navigation tile.

7. The method of claim 3, wherein varying the size of the second navigation tile is based on one or more of an increase of information associated with the second respective content related information or a decrease of information associated with the second respective content related information.

8. The method of claim 1, further comprising
determining, based on the interaction with the electronic program guide, the scroll mode associated with the scroll element.

9. A method, comprising:
providing, by a computing device, an electronic program guide comprising:
a plurality of navigation tiles that are generic to a user, wherein each of the plurality of navigation tiles is associated with a respective content item, wherein each of the plurality of navigation tiles comprises respective content related information associated with the respective content item,
a scroll element configured to scroll through the plurality of navigation tiles at a variable speed, wherein the variable speed is based on one or more of a scroll mode associated with the scroll element or a proximity of an interaction to the scroll element, and
a channel number index associated with the scroll element;
receiving, by the computing device, a signal indicative of a user interaction;
based on the user interaction being in a first direction, updating the plurality of navigation tiles with a first plurality of navigation tiles associated with the user, wherein the first plurality of navigation tiles comprises a user viewing history; and
based on the user interaction being in a second direction, updating the plurality of navigation tiles with a second plurality of navigation tiles comprising at least one recommendation associated with content and the user.

10. The method of claim 9, wherein the first direction is one of a horizontal direction or a vertical direction, wherein the second direction is the other of the horizontal direction or the vertical direction, and the method further comprising, updating, based on the user interaction being in a third direction, the plurality of navigation tiles with a third plurality of navigation tiles comprising content related information associated with the user, wherein the content related information associated with the user comprises one or more of a viewing history or a recommendation.

11. The method of claim 9, wherein updating the plurality of navigation tiles with the second plurality of navigation tiles comprises rendering, based on proximity of the user interaction to the scroll element, at least one of the plurality of navigation tiles in a condensed view or an expanded view.

12. The method of claim 9, further comprising updating, based on the user interaction being in a fourth direction, the plurality of navigation tiles with a fourth plurality of navigation tiles comprising content related information associated with an application.

13. A method, comprising:
providing, by a computing device, an electronic program guide comprising:
a plurality of navigation tiles that are generic to a user, wherein each of the plurality of navigation tiles is associated with a respective content item, wherein each of the plurality of navigation tiles comprises respective content related information associated with the respective content item,
a scroll element configured to scroll through the plurality of navigation tiles at a variable speed, wherein the variable speed is based on one or more of a scroll mode associated with the scroll element or a proximity of an interaction to the scroll element, and
a channel number index associated with the scroll element
receiving, by the computing device, an instruction; and
updating, based on the instruction being associated with a first direction and a relevancy to a user, the plurality of navigation tiles with a first plurality of navigation tiles of the plurality of navigation tiles, wherein the first plurality of navigation tiles comprises content related information associated with the user, wherein the content related information associated with the user comprises one or more of a viewing history or a recommendation.

14. The method of claim 13, wherein the relevancy to the user comprises at least one of a preference associated with the user, a content recording associated with the user, or social media associated with the user.

15. The method of claim 13, wherein the content related information associated with the user further comprises a plurality of content channels available to the user based on at least one of a subscription or a payment.

16. The method of claim 13, wherein the content related information associated with the user further comprises one or more of a user preference or a content recording.

17. The method of claim 13, wherein the instruction is at least one of a swipe, a scroll, or a slide on a display device.

18. The method of claim 2, further comprising updating the electronic program guide with a third navigation tile based on the user interaction being in a third direction, wherein the third direction is different from both the first direction and the second direction.

19. The method of claim 10, wherein the second plurality of navigation tiles or the third plurality of navigation tiles comprises at least one tile in a condensed view or an expanded view based on the user interaction.

20. The method of claim 8, wherein the scroll mode comprises at least one of a scroll or a fast scroll.

* * * * *